United States Patent [19]

Crego et al.

[11] 3,964,492

[45] June 22, 1976

[54] PROJECTIONS ON ROTOR AUGER OF AXIAL FLOW COMBINE

[75] Inventors: John B. Crego, New Holland; Everett C. Cowan, Jr., Parkesburg; John D. Riffanacht, Leola; Larimer J. Knepper, New Holland; Edward W. Rowland-Hill, Lancaster, all of Pa.

[73] Assignee: Sperry Rand Corporation, New Holland, Pa.

[22] Filed: Mar. 20, 1975

[21] Appl. No.: 560,266

[52] U.S. Cl. ............................. 130/27 T; 198/213
[51] Int. Cl.² ........................................ A01F 12/20
[58] Field of Search ............ 56/14.5, 14.6, 122–125; 130/27 R, 27 J, 27 JT, 27 K, 27 L, 27 P, 27 Q, 27 S, 27 T; 198/136, 64, 213–217

[56] References Cited
UNITED STATES PATENTS

| | | | |
|---|---|---|---|
| 292,550 | 1/1884 | Fairly | 198/213 X |
| 301,506 | 7/1884 | Massey | 198/213 |
| 1,684,254 | 9/1928 | Bailey | 198/213 |
| 2,303,584 | 12/1942 | Schweickart | 198/213 |
| 2,397,305 | 3/1946 | Wheat | 198/213 |
| 3,306,433 | 2/1967 | Blanshine | 198/213 |
| 3,664,100 | 5/1972 | Rowland-Hill | 56/14.6 |
| 3,762,537 | 10/1973 | Lutz | 198/213 |

Primary Examiner—Russell R. Kinsey
Attorney, Agent, or Firm—C. Hercus Just; Frank A. Seemar; John R. Flanagan

[57] ABSTRACT

A rotor for axial flow combines having an auger of predetermined length on one end thereof which, when rotated, feeds crop material to the main portion of the rotor which coacts with a concave and grate to thresh and separate grain from the crop material. The auger has a spiral flight provided with a smoothly curved peripheral edge and in order to minimize wear of said edge and also provide increased aggressive engagement of the auger with crop material, a series of similar projections are detachably connected to said flight adjacent the peripheral edge thereof, in circumferentially spaced relationship to each other. The projections have a curved apex from which opposite sides of the projection slope in different degrees respectively to provide different operational characteristics, depending upon which edge is disposed in leading position relative to the direction of rotation of the rotor and said projections being detachably connected to the flight of the auger for reversibility thereof as well as replacement purposes.

9 Claims, 5 Drawing Figures

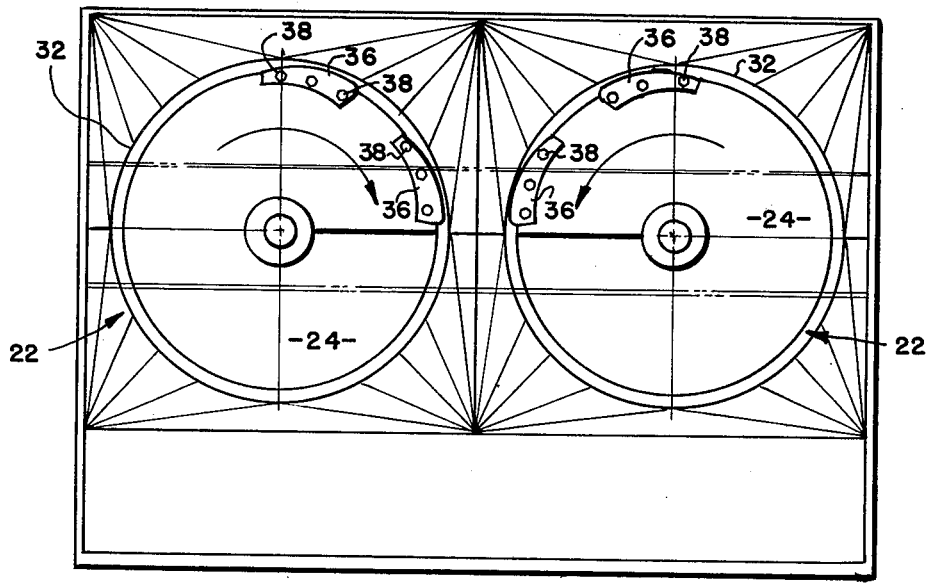
FIG. 3
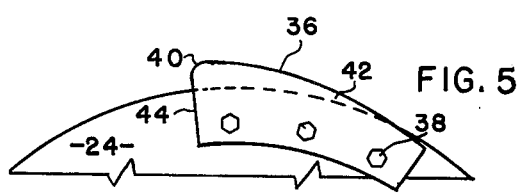
FIG. 5
FIG. 4
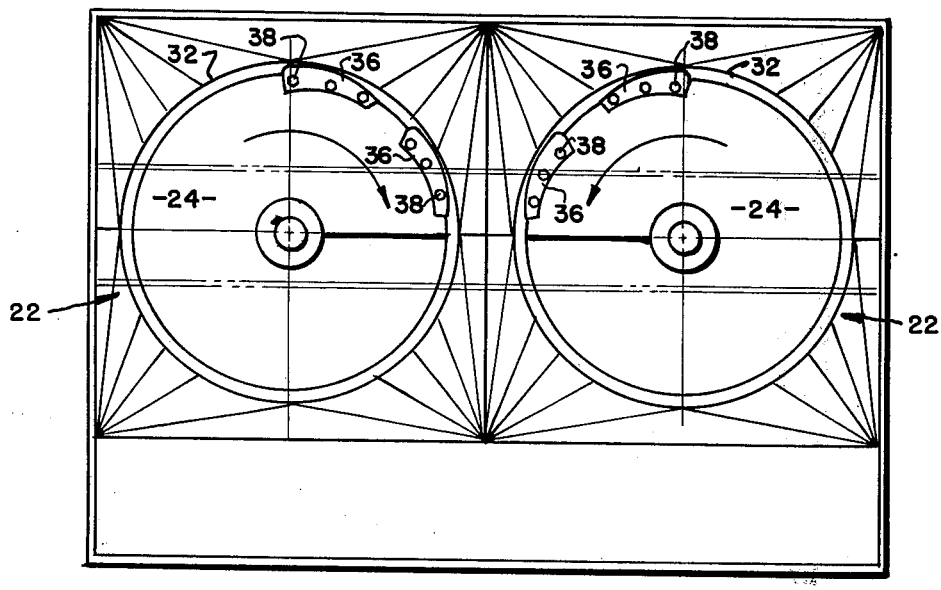

PROJECTIONS ON ROTOR AUGER OF AXIAL FLOW COMBINE

CROSS-REFERENCE TO RELATED APPLICATIONS

This application is one of a limited series of applications filed on even date herewith and respectively pertaining to different improvement inventions applicable generally to an axial flow combine of the type, for example, shown and described in U.S. Pat. No. 3,664,100, dated May 23, 1972 and assigned to the same assignee as the instant invention.

BACKGROUND OF THE INVENTION

Combines for harvesting grain crops, in particular, have been known for many years. They have been responsible for effectively harvesting huge fields of wheat and other similar stalk types of grain in limited time with much saving in labor. To render the same more effective and efficient, recent developments in combines have resulted in the same becoming increasingly powerful, especially to achieve improved production in the harvested grain and also to increase the production capacity of the combines. This has also resulted in greatly increased cost of the combines.

With such increased cost of combines, efforts in recent years have been made to render such combines capable of harvesting not only conventional types of stalk grains such as wheat, oats, barley and the like, but also, with limited adjustment, rendering the combines capable of harvesting other types of grain crops such as corn, as well as also being capable of harvesting such crops as beans, such as soy beans for example, as well as other types of beans and the like.

Harvesting such a wide range of crops has required the development of improved threshing and separating mechanism in the combines with the general aim of minimizing replacement of certain components thereof in order to adapt the combine to harvesting one type of crop from another. Preferably, said aim has been in the direction of providing equipment which, essentially, requires only the adjustment of spacing or the like between the various coacting threshing elements of the combine, and machines generally capable of achieving these desired results constitute subject matter, for example, of the following prior patents, all assigned to the assignee of the present invention:

| | |
|---|---|
| 3,626,473 | Dec. 7, 1971 |
| 3,645,270 | Feb. 29, 1972 |
| 3,664,100 | May 23, 1972 |
| 3,794,047 | Feb. 26, 1974 |

Since the development of the machines comprising the subject matter of the foregoing patents, additional detailed improvements have been invented to render the operation of axial flow combines even more effective and the present invention represents one of said improvements.

Particularly in regard to the harvesting of crops having heavy stalk characteristics such as corn, as well as other crops having tough vines, which must be handled by a universal type combine, after the crop is cut by a header or other type of cutting unit, it is elevated to the axial flow type threshing and separating mechanism comprising one or more rotors operable in one or more cylindrical casings which include in a portion of the wall structure thereof concaves and grate units with which the rotors coact to achieve such threshing and separation of the grain from the crop material. The crop material is fed to such axial rotors by augers having coarse flights thereon mounted adjacent the forward end of the rotors.

Harvesting certain of the aforementioned types of crops have been found to result in undesirable wear upon the peripheral edges of such flights, thereby decreasing the efficiency of the combine especially as said wear increases. Replacement of a worn auger is a time consuming and relatively expensive operation and it is the general purpose of the present invention to minimize such replacement neccessities as well as increase the efficiency of said augers by improving the structure of the same in accordance with the details set forth hereinafter.

SUMMARY OF THE INVENTION

It is the principal object of the present invention to provide upon the periphery of the flights of one or more rotor augers of an axial flow combine projections provided with a profile having at least one curved portion which engages the crop material for purposes of rendering said flights more aggressive in the engagement of crop material to feed the same into engagement by the principal portions of the rotor as well as the concave and grate, and also to minimize wear upon the peripheral edge of the flights of the rotor augers. This also results in reduced power requirements without reducing feeding efficiency and the curved portion in the profile of the projections obviates wrapping crop material around the tubular auger shaft.

It is another object of the invention to provide such projections with curved apexes that extend outermost from the peripheral edges of the flights and the opposite ends of said projections preferably curve and slope toward the periphery of the flight at different angles respectively to provide different operational characteristics in accordance with the type of crop intended to be harvested by the combine.

Ancillary to the foregoing objective, it is a further object to detachably connect said projections to the outer portions of the flight of the auger, such as by a plurality of bolts, to render the same readily connectable in the field, whereby not only may the projections be replaced by new projections when worn beyond further use but, more importantly, said projections may be reversed in their relative positions on the outer portions of the flight selectively to dispose one or the other of said different side edges of the projection in leading position with respect to the direction of rotation of the rotor and thus effect the most efficient operation of the rotor with respect to certain crops.

It is still another object of the invention to apply said projections to the flights of rotors on combines employing multiple rotors which respectively rotate in opposite rotary directions and, correspondingly, the augers also rotate in opposite directions for purposes of coacting with each other to feed crop material in a direction to move from the outermost opposite portions of the cylinders, within which the rotors operate, toward the adjacent portions of said rotors and, in accordance with the principles of the invention, the selected sides of the projections are similarly disposed in the desired direction of movement of both of the augers for maximum efficiency in harvesting a specified crop.

In attempting to solve the problem of minimizing wear of the flights and providing more aggressive engagement of the material by said augers, the earlier attempts included adding a series of sharply pointed projections to the periphery of the flights at circumferentially spaced locations. This was followed by the additional attempt to add a series of short strips having serrations similar to saw teeth along the outer edges. Both of these attempts were discarded in favor of the concept comprising the present invention because they did not afford the desired results and especially self-clearing of the projections during operation.

Details of the foregoing objects and of the invention are described in the following specification and illustrated in the accompanying drawings comprising a part thereof.

BRIEF DESCRIPTION OF THE DRAWINGS

FIG. 3 is a fragmentary, enlarged vertical section of a portion of the combine shown in FIG. 1 as seen on the line 3—3 thereof and in which certain elements of the present invention are arranged in one embodiment thereof.

FIG. 4 is a view similar to FIG. 3 but in which said elements of the invention are arranged in a second embodiment in accordance with the principles of the invention.

FIG. 5 is a fragmentary elevation, still further enlarged over the scale shown in FIG. 3 and illustrating in greater detail one of the elements of the invention illustrated in FIG. 3.

DETAILED DESCRIPTION

Figure 1:
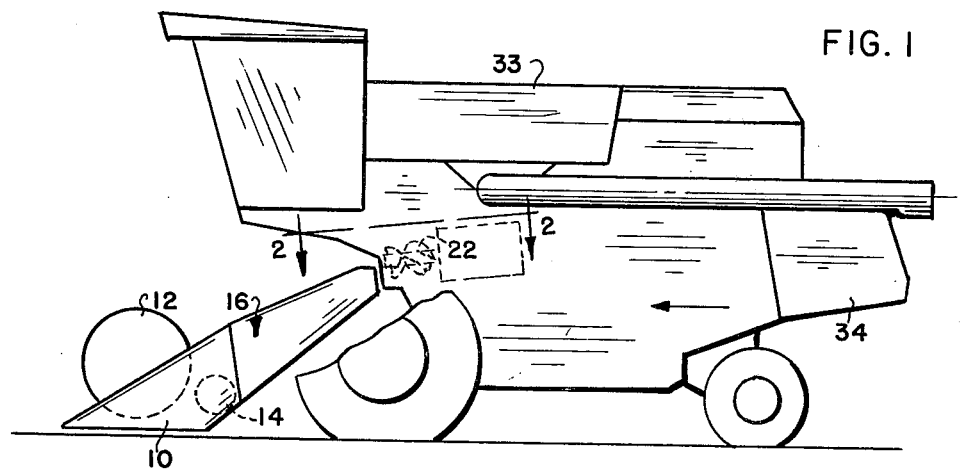
FIG. 1 is a fragmentary side elevation of an exemplary axial flow type combine to which the present invention is applicable, parts of the same being broken away to expose certain details thereof.
Figure 2:
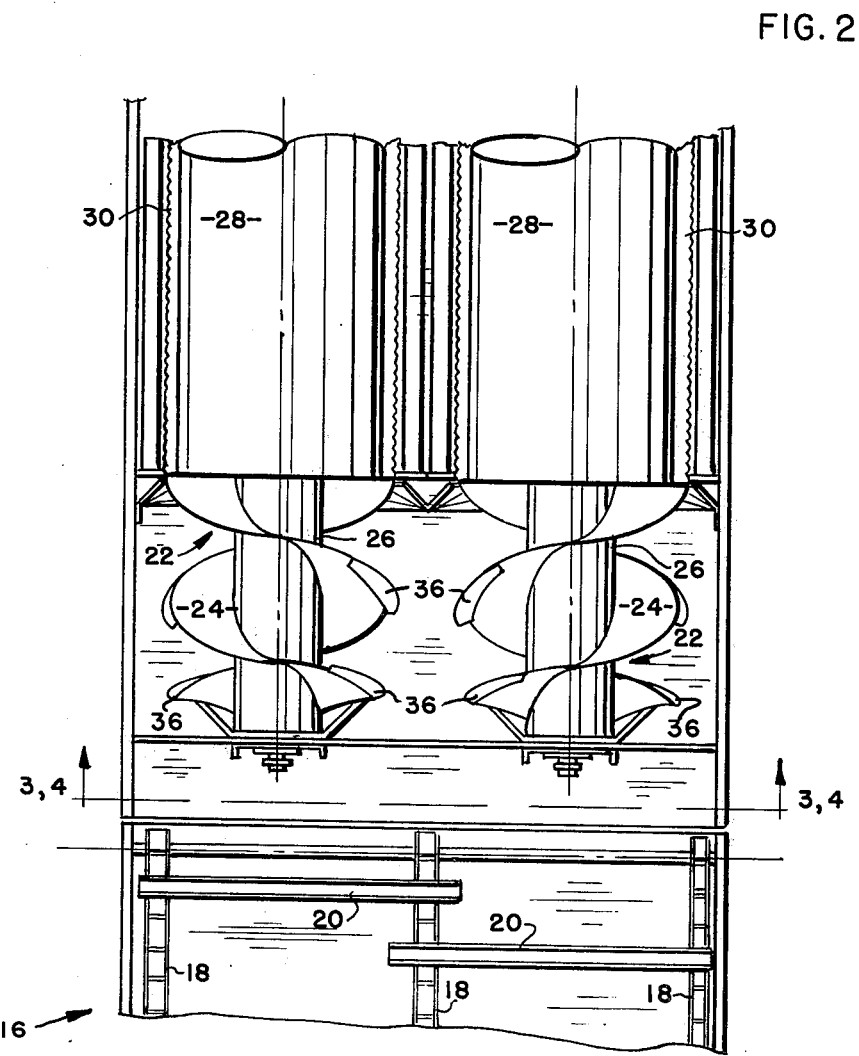
FIG. 2 is a fragmentary, enlarged horizontal sectional view of the area of the combine shown in FIG. 1 in which the present invention is located, as seen on the line 2—2 of FIG. 1.

Referring to FIG. 1, it will be seen that said figure illustrates the essential components of an axial flow combine of the type to which the present invention pertains. The combine is mobile and moves along a field in the direction of the arrows shown therein. On the forward end of the combine is a header 10 and in accordance with conventional structure of this type of combine, said header may be of the order of twenty feet or more in width, whereby a relatively wide swath of crop material is capable of being cut by a conventional sickle bar, not shown in detail, but nevertheless conventionally included in headers of such combines. A rotatable reel 12 of exemplary type is also shown somewhat diagrammatically, together with a converging auger 14 which also is of conventional type and is driven by appropriate mechanism, not shown in detail, for purposes of moving the crop material toward the center of the header 10 for engagement by a conventional elevator 16, a fragmentary portion of which is shown in FIG. 2. Said elevator comprises a plurality of endless flexible chains 18 or other similar members between which transverse impelling slats or strips 20 extend, the same being connected to the endless flexible members 18, the lower span of said flexible members 18 engaging the cut material and delivering the same at the upper end of the upwardly inclined elevator, in an undershot manner to the lower portions of a pair of augers 22 which incorporate the principle features of the present invention.

The augers 22 comprise part of threshing and separating units, details of which are illustrated and described as well as being claimed in said aforementioned patents and, in particular, U.S. Pat. Nos. 3,626,472 and 3,794,047, to which attention is directed for a detailed description of other features and characteristics of the combine to which the present invention pertains. The augers 22 comprise spiral flights 24 formed, for example, from sheet metal of suitable gauge, the inner edges thereof being firmly secured such as by welding to the forward end portions of tubular shafts 26 that mount rotors 28 which include threshing mechanism such as rasp bars and otherwise, not shown in detail, which cooperate with concaves and grates 30 disposed in the lower portions of cylindrical casings 32 which are shown in FIG. 3. Details of the main portions of the rotor 28 and the concaves and grates 30 do not comprise part of the present invention except for purposes of background of an understanding of the invention and therefor attention is directed to said aforementioned patents for further details thereof.

The purpose of the augers 22 is to feed crop material delivered thereto by the elevator 16 to the rotors 28 for threshing and separation of the grain of the crop material from the stalks and other residue of the crop material, said grain, after being separated, being introduced by suitable conduits, not shown, to the grain bin 32 which is carried by the frame of the combine and is of suitable capacity to hold a substantial quantity of the threshed grain or other threshed crop. The residue of the crop material such as stalks, leaves and otherwise is discharged upon the ground from the discharge end of 34 of the conduit as shown in FIG. 1.

As mentioned hereinabove, combines of the type to which the present invention pertains are constructed to harvest a relatively wide variety of crop material and thresh the desired portion thereof from the remaining waste portion. Some types of crops such as corn include bulky stalk material which is quite tough. Certain types of bean crops, such as soy beans, as well as other similar crops also have tough vines. Usually, the combine has a self contained power unit such as a diesel engine or the like of substantial horsepower. However, the elements driven by such powerful engine must be capable of withstanding the forces imposed thereon by the engine, such as the augers 22, rotors 28, and concaves and grates 30. Many of the crop materials to be handled by the combine also are of an abrasive nature and it has been found that these result in the peripheries of the flights 24 being subjected to wear at a rate which is undesirable. As the terminal edges of said flights wear away, the efficiency thereof decreases for purposes of feeding the crop material to the threshing and separating equipment. Accordingly, it is the principle purpose of the present invention to minimize the wear upon said flight and also increase the effectiveness thereof to aggressively engage the crop material and feed the same axially into engagement by the rotors 28 and concaves and grates 30.

The improvement afforded by the present invention primarily comprises the provision of projections or projecting members 36 which are attached to the periphery of the flights 24, the same preferably being detachably connected thereto by the employment of a plurality of bolts 38 which extend through aligned holes in the projections 36 and the flights 24 adjacent the periphery thereof as can best be seen in FIGS. 3–5. The projections 36, preferably should be formed from relatively hard metal.

The projections 36 are arranged in circumferentially spaced relationship to each other for intermittent engagement with the crop material to effect said aggressive feeding thereof and it will be seen particularly from FIGS. 3–5 that the outer profiles of each of the projections terminate radially outward in at least one curved portion, preferably being in the form of a rounded apex 40 which is best shown in FIG. 5. Also, the opposite ends 42 and 44 of the projections 40, with respect to the rounded apex 40, slope toward the periphery of the flight 24 at substantially different angles. From FIG. 5, it will be seen that the end 42 is much more gradual in slope than the relatively abrupt end 44 of the projection. Accordingly, depending upon the direction of rotation of the augers 22, and under the circumstances where all of the projections 36 have either the end 42 or end 44 in leading position with respect to the direction of rotation, different aggressive engagement of the crop material by the projection will be accomplished. While the projections 36 afford the desired aggressive feeding engagement with the crop material, they are self-clearing and cleanly disengage the material after engaging it because of the contour of said projections. It has been found that the augers perform more effectively with certain crops when the gradually sloping ends 42 are disposed in leading direction, while other crops are more effectively engaged when the opposite ends 44 are disposed in leading direction with respect to rotation of the augers. From FIG. 5, especially, it will be seen that end 44 of each projection is substantially radial relative to periphery of flight 24 and it is obvious that such ends will much more aggressively engage material than ends 42.

By referring to FIGS. 3 and 4, it will be seen that in FIG. 3, the projections 36 are disposed in one position of aggressive engagement upon the augers 22, while in FIG. 4, the projections 36 have been reversed. The directions of rotations of the augers in said FIGURES are shown by directional arrows and it will also be seen that said augers are driven in opposite rotary direction for purposes of effecting the greatest concentration of feeding in the central portion of the assembly of augers for ultimate engagement of the crop material by the rotors 28. Also, it will be understood that the augers are also driven in the same opposite rotary directions and under all circumstances, regardless of the disposition of the projections 36 upon the flight thereof.

Because of the relatively simple manner in which the projections 36 are attached to the flights 24 of the augers 22, it can be appreciated that if it is desired, such as in the field of operation, to change the projections from one position to another, especially if the harvesting of one crop has been completed and it is desired to undertake the harvesting of another crop, such reversing of the projections 36 is accomplished readily and with simple wrenches for the desired purpose. In addition, not only may the projections 36 be reversed for the purposes described but, in the event the same become worn beyond further use, they readily may be replaced by new projections at minimum cost and installation expense. Moreover, because the projections 36 extend beyond the periphery of the flights 24 a suitable amount to provide more aggressive engagement of the crop material by the augers than would be possible if no such projections were employed, minimizing of wear upon the periphery of the flights 24 also is a beneficial result of the present invention, particularly in view of the fact that replacement of the augers 22, when worn beyond further use, is a major expense and by employment of the present invention, a much greater life of the flights 24 is possible than in the absence of the use of the projections 36.

It also can be appreciated that one way to increase feed effectiveness of the auger would be to increase the diameter of the periphery of the flights, thereby decreasing the space between the flights and concaves. This would require greater driving power. Hence, by using the projections of the present invention, the more aggressive effect of a greater diameter of auger flight is achieved but because of the circumferential spacing of said projections, no additional power is required. Stated another way, power requirements are reduced without reducing feeding efficiency by providing the projections of the invention rather than increasing the diameter of continuous flighting.

Another significant advantage of providing the projection with a profile which has at least one curved portion is that the arrangement is self-clearing relative to the material and obviates wrapping crop material around the tubular support or shaft for the auger, as opposed to projections having sharp portions in the profile, such as serrated edges.

From the foregoing, it will be seen that the present invention, by simple and relatively inexpensive means, greatly extends the life of the flights of augers in an axial flow type combine and, in addition, provides, selectively, a plurality of different degrees of aggressiveness by which the augers engage crop material to feed the same to the threshing and separating mechanism of such combine. Accordingly, greater versatility is provided for the combine and even when it becomes necessary to replace the projections 36, the same may be undertaken very simply, even by unskilled help, in the field or otherwise, at very substantially less expense than that which is incurred in replacing worn augers by new augers.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A rotor for an axial flow combine having one end comprising an inlet end and rasp bars extending longitudinally thereof from said inlet end toward the other end for coaction with a complementary concave to thresh and separate grain from crop material, and an auger fixed to and extending forwardly from said inlet end of said rotor and concave and having a continuous spiral flight of predetermined length provided with a relatively smooth peripheral edge, in combination with a series of wear-resistant projections attached to said flight in circumferentially spaced relation to each other along the periphery of said flight and extending beyond the peripheral edge of said flight, the outer profile of each of said projections having at least one curved portion projecting radially farther than other portions of said profile of said projections to effect aggressive intermittent engagement with crop material when rotated in a direction for said auger to feed the same toward said rasp bars and concave for threshing thereby while minimizing wear upon the periphery of said flight.

2. The rotor according to claim 1 in which said projections extend substantially similar radial distances beyond the peripheral edge of said flight of said auger.

3. The rotor according to claim 1 in which said projections are provided with a curved apex which extends outermost relative to the periphery of the flight to which the same are attached and one end of the projecting portion of said projections sloping toward the perpihery of said flight more gradually than the other end of said projections.

4. The rotor according to claim 3 in which said other end of said projections extend substantially radially from said curved apex toward the periphery of the flight to which they are connected and thereby afford more aggressive engagement of crop material by said projections than said more gradually sloping one end of said projections when the rotor is rotated with said other ends of said projections in leading direction.

5. The rotor according to claim 3 further including means detachably connecting said projections to said flights adjacent the periphery thereof, whereby said projections may be reversed to effect different types of aggressive engagement of crop material by said projections depending upon which end of the projections are disposed in leading position relative to the direction of rotation of said rotor.

6. In an axial flow combine having a threshing and separation unit comprising a pair of elongated and substantially cylindrical casings each having an inlet end arranged to receive crop material to be threshed as it is moved along said casings toward the opposite ends, a concave and grate in the lower portion of each casing, a rotor coaxial with and rotatably mounted within each cylindrical casing and each rotor having an auger on the end thereof adjacent said inlet end of said casings and provided respectively with a fixed spiral flight having relatively smooth peripheral edges, the spiral flights on said rotors extending reversely to each other, and power means connected to said rotors and operable to rotate the same in opposite rotary directions causing said augers to feed crop material into said cylindrical casings to thresh the same, in combination with projections attached to said smooth peripheral edges of said flights at spaced intervals therealong, said projections respectively extending radially beyond the peripheral edge of said flights and having curved outer edges to provide aggressive feeding engagement with crop material and minimize wear upon the peripheral edges of said flights, said projections having curved apex portions and one end of said projections sloping more gradually from the apex than the other and said projections being arranged on both flights with similar sloping ends leading the other in the direction of rotation of said rotors.

7. The axial flow combine according to claim 6 in which said projections respectively project substantially similar distances beyond the peripheral edge of the flights of said augers.

8. The axial flow combine according to claim 6 in which said rotors further include means detachably connecting said projections to the flights of said augers, thereby permitting reversibility of said projections upon said flights and ready replacement thereof when worn beyond further use.

9. In an axial flow combine having at least one axially arranged threshing and separating unit, said unit including an elongated casing having an inlet end adapted to receive crop material, a rotor arranged coaxially with and mounted for rotation relative to said casing, and elements arranged along said rotor and said casing for coaction together to thresh and separate crop material upon rotation of said rotor, said rotor having an auger on the end thereof adjacent said casing inlet end and projecting forwardly beyond the same for feeding crop material to said inlet end of said rotor and casing upon rotation of said auger, said auger having a continuous spiral flight of predetermined length provided with a relatively smooth peripheral edge, the improvement which comprises a series of projections attached to said auger flight in circumferentially spaced relation to each other along the periphery of said flight and extending beyond the peripheral edge of said flight, the outer profile of each of said projections having at least one curved portion projecting radially farther than the other portions of said profile for adapting said projections to effect aggressive intermittent engagement with crop material when said auger is rotated in a direction to feed crop material to said threshing and separating unit while minimizing wear upon the periphery of said flight.

* * * * *